(12) United States Patent
Okubo et al.

(10) Patent No.: US 6,627,368 B2
(45) Date of Patent: Sep. 30, 2003

(54) ORGANIC METAL COMPLEX COMPOUND AND ELECTROSTATIC IMAGE DEVELOPING TONER USING THE SAME

(75) Inventors: Masaki Okubo, Koriyama (JP); Hiroshi Nanaumi, Koriyama (JP); Masataka Sawano, Koriyama (JP)

(73) Assignee: Hodagaya Chemical Co., Ltd., Kawasaki (JP)

( * ) Notice: Subject to any disclaimer, the term of this patent is extended or adjusted under 35 U.S.C. 154(b) by 0 days.

(21) Appl. No.: 09/729,940

(22) Filed: Dec. 6, 2000

(65) Prior Publication Data

US 2001/0004667 A1 Jun. 21, 2001

(30) Foreign Application Priority Data

Dec. 7, 1999 (JP) ............................. 11-347464

(51) Int. Cl.$^7$ ............................................. C03G 9/097
(52) U.S. Cl. .................................................. 430/108.23
(58) Field of Search ................ 430/108.23, 110; 534/721, 722, 692

(56) References Cited

U.S. PATENT DOCUMENTS

| | | | | |
|---|---|---|---|---|
| 4,857,432 A | * | 8/1989 | Tanikawa et al. | 430/108.23 |
| 5,508,139 A | * | 4/1996 | Tanaka et al. | 430/108.23 |
| 5,843,611 A | * | 12/1998 | Sukata et al. | 430/108.23 |
| 6,090,515 A | * | 7/2000 | Tomiyama et al. | 430/108.23 |
| 6,197,467 B1 | * | 3/2001 | Yamanaka et al. | 430/108.21 |

FOREIGN PATENT DOCUMENTS

| | | | | |
|---|---|---|---|---|
| EP | 0479285 A | * | 4/1992 | ............ 430/108.23 |
| EP | 977093 A2 | * | 2/2000 | |

OTHER PUBLICATIONS

Diamond, A. S. ed. *Handbook of Imaging Materials*, Marcel Dekker, Inc., NY (1991), Section 4.2.4, p. 169, 1991.*

\* cited by examiner

*Primary Examiner*—Janis L. Dote
(74) *Attorney, Agent, or Firm*—Oblon, Spivak, McClelland, Maier & Neustadt, P.C.

(57) ABSTRACT

A toner composition, comprising an organometal complex compound having the formula (1), which has an electroconductivity of at most 110 $\mu$S/cm when dispersed in ion-exchanged water in an amount of 1 wt %:

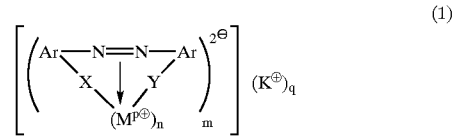

(1)

wherein Ar is an aryl group selected from the group consisting of a substituted or unsubstituted phenyl group and a substituted or unsubstituted naphthyl group, X and Y are —S—, —O—, —CO—, —COO—, —NH— or —NR—, wherein R is $C_{1-4}$ alkyl; $K^+$ is hydrogen ion, lithium ion, sodium ion, potassium ion, ammonium ion, organoammonium or a mixture thereof; m is the number of azo compound groups coordinated to Fe and is 1, 2, 3 or 6; p is the valence of Fe; n is 1, 2 or 4; and q is 0 or an integer, as a component of an electrostatic image developing non-magnetic toner.

4 Claims, No Drawings

ORGANIC METAL COMPLEX COMPOUND AND ELECTROSTATIC IMAGE DEVELOPING TONER USING THE SAME

BACKGROUND OF THE INVENTION

1. Field of the Invention

The present invention relates to a organic metal complex compound useful to be used in a toner as an electrophotographic developer and an electrophotographic image developing toner containing the organic metal complex compound.

2. Prior Arts

A developing method used for an electrophotographic method is classified into a dry type developing method and a wet type developing method. The former method is classified into a method of using a two-component type developer and a one-component type developer.

A toner used for these developing methods, comprises fine powders having a dye or a pigment dispersed in a natural or synthetic resin. For example, there is used a toner comprising finely divided particles of about 5 to 15 $\mu$m having a coloring agent dispersed in a binder resin such as polystyrene. Also, there is used a magnetic toner containing magnetic particles such as magnetite.

It is necessary for any of these toners to have positive or negative charges depending on a polarity of an electrostatic latent image to be developed. In order to have the toner charged, it is possible to use tribo-chargeability of resin as a component for the toner, but according to this method, a developed image tends to cause fogging and to be unclear. Therefore, in order to impart a desired tribo-chargeability to a toner, it is carried out to add a dye or a pigment imparting chargeability or to add a charge control agent.

A toner containing a charge control agent tends to pollute a toner-carrying material such as a developing sleeve, and therefore a tribo-charged amount is lowered in proportion to an increase in an amount of copied sheets, thereby easily causing a decrease in an image density. Also, a certain kind of a charge control agent does not provide a sufficient tribo-charge amount, and tends to be easily influenced by temperature or humidity, thereby causing a variation in an image density by an environmental change.

Also, a certain kind of charge control agent does not have a satisfactory dispersibility in resin, and therefore a toner containing the same tends to provide ununiform tribo-charge amounts between toner particles, thereby easily causing fogging. Further, a certain kind of charge control agent has a poor storage stability, and tends to lower a tribo-charge amount during storing for a long term.

In order to solve these problems, JP-A-61-155464 proposes to use an iron type complex compound.

According to this publication, the iron type complex compound has a negative tribo-chargeability, and has a very satisfactory compatibility with resin, and since this is an iron type complex compound, it is disclosed to be satisfactory also in view of environmental safety unlike such a conventional chromium compound as disclosed in JP-A-55-42752.

Recently, a printer or a facsimile employing an electrophotographic method has been developed, and a copying speed has been required to be higher and higher year by year, and there is demanded a toner which can be appropriately charged instantly in a shorter time than a conventional copying machine. Thus, as compared with a conventional toner, such a toner containing an iron type complex compound as disclosed in JP-A-61-155464 is required to be appropriately charged instantly when converting from a suspending state to an input state and is also required not to lower a tribo-charging performance even after being allowed to stand for a long time.

SUMMARY OF THE INVENTION

An object of the present invention is to solve the above-mentioned problems of prior arts and to provide a toner having a satisfactory building-up of chargeability and providing a satisfactory reproduction of a stable image for a long time without being influenced by a change in temperature and humidity even after repeating development by continuous use.

The present inventors have studied and discovered that a toner using a organic metal complex compound adjusted to be dispersed in ion-exchanged water in such a manner as to have an electroconductivity lowered to a certain level or less, provides a satisfactory environmental stability, an improved building-up of chargeability, a stable charging performance and a satisfactory stable image density. The above-mentioned method of providing a charge control agent having a quality level satisfying requirements of a high-speed copying and a satisfactory control is quite novel.

Thus, the present invention provides a organic metal complex compound represented by the following formula (1) or (2), which has an electroconductivity of at most 110 $\mu$S/cm when dispersed in ion-exchanged water in an amount of 1 wt %, and an electrostatic image developing toner containing the organic metal complex compound.

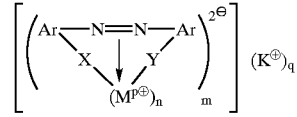

(1)

In the above formula, M is a coordinated center metal such as Sc, Ti, V, Cr, Co, Ni, Mn and Fe; Ar is an aryl group such as a substituted or unsubstituted phenyl group and a substituted or unsubstituted naphthyl group, examples of the substituent of which include a $C_1$–$C_{18}$ alkyl group, a $C_1$–$C_{18}$ alkoxy group, a nitro group, a halogen group, an alkenyl group, a sulfonamide group, a sulfonalkyl group, a sulfonic acid group, a carboxyl group, a carboxyester group, a hydroxyl group, an acetylamino group, a benzoylamino group, a substituted or unsubstituted anilide group, and the like; X and Y are —S—, —O—, —CO—, —COO—, —NH—, —NR— (R is a $C_1$–$C_4$ alkyl group) and the like; $K^+$ is a hydrogen ion, a lithium ion, a sodium ion, a potassium ion, an ammonium ion, an organic ammonium ion, and a mixture thereof; m is a number of an azo compound coordinated to a metal M, and is 1, 2, 3 or 6; p is a valence of a metal M; n is 1, 2 or 4; and q is 0 or an integer.

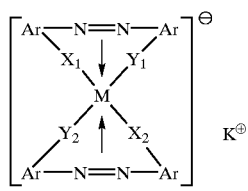

In the above formula, M is a coordinated center metal such as Sc, Ti, V, Cr, Co, Ni, Mn and Fe; Ar is an aryl group such as a substituted or unsubstituted phenyl group and a substituted or unsubstituted naphthyl group, examples of the substituent of which include a $C_1$–$C_{18}$ alkyl group, a $C_1$–$C_{18}$ alkoxy group, a nitro group, a halogen group, an alkenyl group, a sulfonamide group, a sulfonalkyl group, a sulfonic acid group, a carboxyl group, a carboxyester group, a hydroxyl group, an acetylamino group, a benzoylamino group and a substituted or unsubstituted anilide group; $X_1$, $X_2$, $Y_1$ and $Y_2$ are —S—, —O—, —CO—, —COO—, —NH— and —NR— (R is a $C_1$–$C_4$ alkyl group); and $K^+$ is a hydrogen ion, a lithium ion, a sodium ion, a potassium ion, an ammonium ion, an organic ammonium ion, and a mixture thereof.

Among the above organic metal complex compounds, the following compound of the formula (3) is particularly preferable as a compound containing no heavy metal such as Cr as a coordinated center metal in view of environmental safety, which achieves such aimed effects of the present invention as to retain an appropriate charge instantly and not to lower a tribo-charging performance even after being allowed to stand for a long time.

Thus, the present invention provides an electrostatic image developing toner, characterized by containing an azo type iron complex compound represented by the following formula (3).

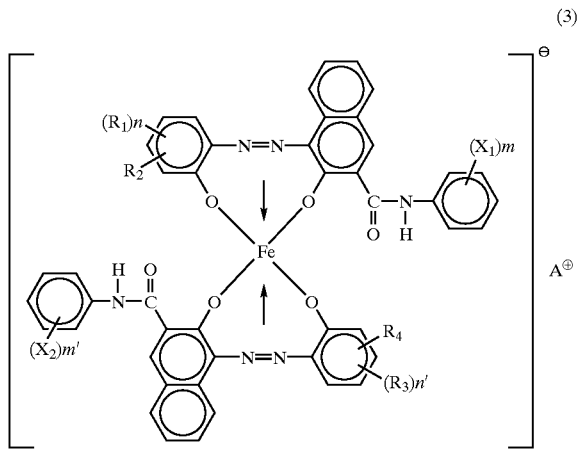

In the above formula, $X_1$ and $X_2$ are a hydrogen atom, a $C_1$–$C_4$ alkyl group, a $C_1$–$C_4$ alkoxy group, a nitro group or a halogen atom; $X_1$ and $X_2$ may be the same or different, and m and m' are an integer of 1 to 3; $R_1$ and $R_3$ are a hydrogen atom, a $C_1$–$C_{18}$ alkyl group, a $C_1$–$C_{18}$ alkoxy group, an alkenyl group, a sulfonamide group, a sulfonalkyl group, a sulfonic acid group, a carboxyl group, a carboxyester group, a hydroxyl group, an acetylamino group, a benzoylamino group, or a halogen atom; $R_1$ and $R_3$ may be the same or different, and n and n' are an integer of from 1 to 3; $R_2$ and $R_4$ are a hydrogen atom or a nitro group; and $A^+$ is a hydrogen ion, a sodium ion, a potassium ion, an ammonium ion, an organic ammonium ion or a mixture thereof.

DETAILED DESCRIPTION OF THE INVENTION

As a result of the study by the present inventors, it has been found that a toner containing a organic metal complex compound having an electroconductivity of less than 110 μS/cm when dispersed in water, provides remarkable advantages of retaining an appropriate charge instantly, having a satisfactory environmental stability and maintaining a stable image density without lowering a tribo-charging performance even after being allowed to stand for a long time at a high temperature and a high humidity, as compared with a toner containing a organic metal complex compound having an electroconductivity of higher than 110 μS/cm when dispersed in water.

It is considered that an electroconductivity can be raised by incorporating an inorganic salt such as an alkali salt, an ammonium salt or the like, but it has been found by the present inventors that a value of electroconductivity is not necessarily proportional to an amount of an inorganic salt to be incorporated into a organic metal complex compound and varies depending on various factors.

However, it is not an object of the present inventors to analyze these factors. The present inventors have discovered that there is a strong corelationship between a stable image density and an electroconductivity when 1 wt % of a organic metal complex compound is dispersed in ion-exchanged water, and the present invention was accomplished on the basis of this discovery. That is, a charge control agent is defined as having a function of imparting a stable electrostatic charge to an electrostatic image developing toner, but when an inorganic salt generated as a by-product is present in the organic metal complex compound in an amount larger than a certain level, there is caused such a problem as to become difficult to maintain a function of providing a stable image after running for a long time not only under a high moisture environment but also under a normal moisture environment. A certain amount of the inorganic salt present in the charge control agent changes also a volume resistivity of the charge control agent, but there is not necessarily a relationship between the volume resistivity of the charge control agent and the image stability. It is considered that when using the charge control agent in an electrostatic image developing toner, the inorganic salt present in the surface layer of the charge control agent provides a great influence on the image stability. That is, the volume resistivity of the charge control agent is changed also by the inorganic salt amount in the inside of the charge control agent, but the image stability is influenced only by the inorganic salt present in only the surface layer of the charge control agent. From this reason, a relationship between an inorganic salt amount and an image stability is not clear since the inorganic salt amount in the surface layer of the charge control agent having an influence on the image stability is not specifically measured in a chemical determination of an amount of the inorganic salt in the charge control agent. According to the present invention, an excellent image stability can be obtained by providing a charge control agent having an electroconductivity within a certain range determined by measuring an electroconductivity when 1 wt % of a organic metal complex compound is dispersed in ion-exchanged water, thereby enabling to measure an inorganic salt amount only in the surface layer of the charge control agent.

Examples of the complex compound are illustrated below.

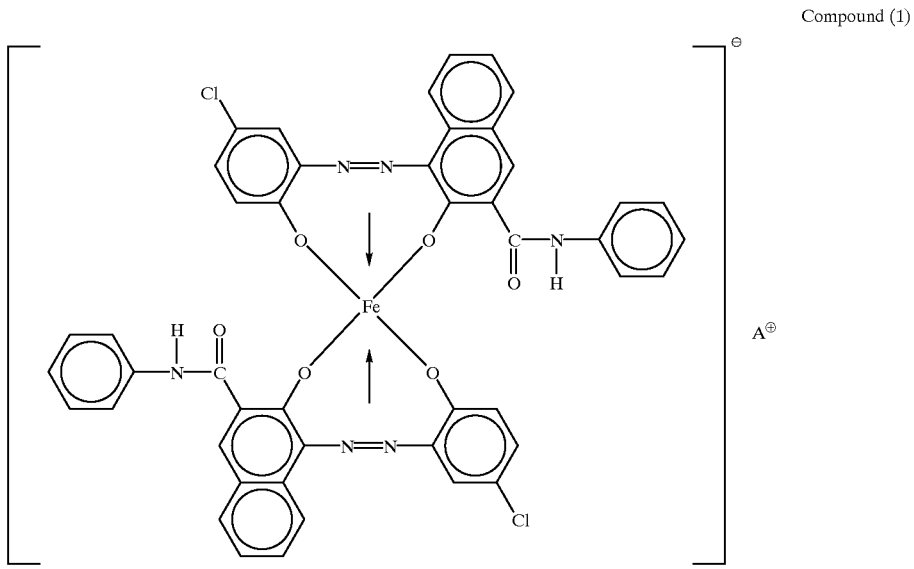
Compound (1)
(In the above formula, A⊕ is a mixture cation of an ammonium ion, a sodium ion and a hydrogen ion.)
Compound (2)
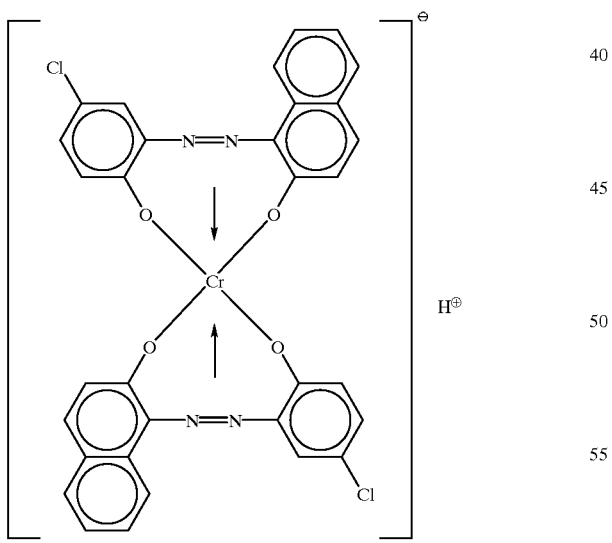

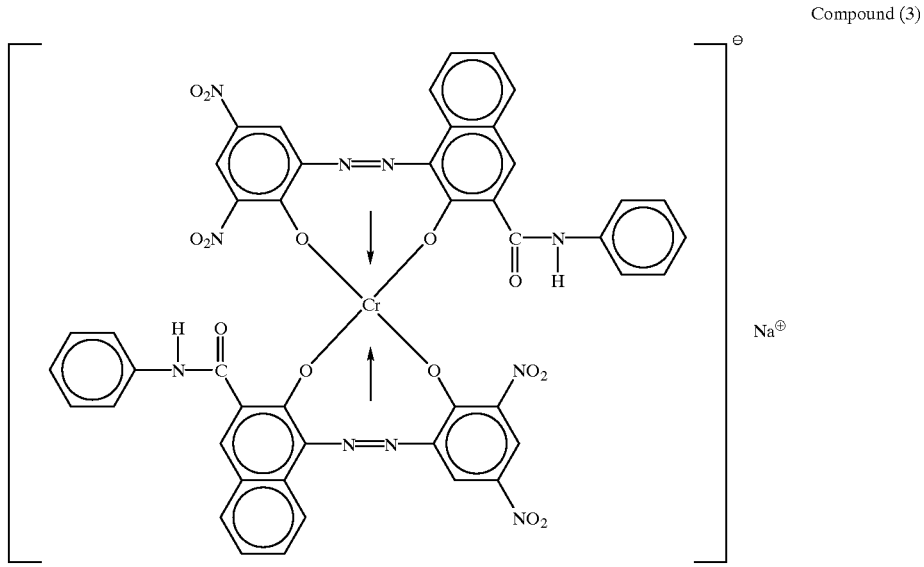

Compound (3)

The above compounds can be prepared by a well known method. For example, Compound (1) can be obtained by diazotizing 4-chloro-2-aminophenol, coupling with naphthol AS to obtain a monoazo compound, forming an iron complex of the monoazo compound by a well known method, and treating an alkali metal salt of the iron complex with aqueous ammonia or various ammonium salts to obtain a compound having a mixture cation of ammonium, alkali and hydrogen ions as a counterpart ion. When the compound thus obtained is washed simply with a filter filter such as a Buchner funnel (Nutsche), an unpreferable material raising an electroconductivity dispersed in ion-exchanged water remains, and it is therefore difficult to obtain a organic metal complex compound desired in the present invention. Also, when the above obtained organic metal complex compound is incorporated into a toner, an image density is adversely affected, and the conventional problem can not be solved.

In order to achieve the object of the present invention, a compound having an electroconductivity of lower than 110 $\mu$S/cm (as measured when 1 wt % of the compound is dispersed in ion-exchanged water) can be prepared by various methods including a method of filtrating under a large pressure by a filter press, a method of filtrating by applying such a large gravity as in centrifugal filtration, a method of squeezing a reaction solvent such as water, a method of washing with a sufficient amount of water, or a method of repeating these operations or a method of combining these operations, and a method of using a reverse osmosis membrane or a semipermeable membrane. Usually, when using a centrifugal filtrating machine for the purpose of achieving the object of the present invention, it is effective to use a washing water dividedly or one time in an amount of 20 to 30 times to a compound to be obtained, and it is particularly preferable to use at least 25 times amount of a washing water. Also, it is effective to carry out chemical purification by dissolving a metal salt compound in an organic solvent and pouring the solution into water to precipitate a crystal, i.e. crystallization operation.

A method of measuring electroconductivity is carried out in the following manner.

1.5 g of a dry product of a organic metal complex compound is dispersed in 150 ml of ion-exchanged water, and the resultant dispersion is boiled for 15 minutes. The boiled dispersion is cooled to room temperature by flowing water, and is filtrated by a 5A filter paper. The filtrate is adjusted to 150 ml with distilled water or ion-exchanged water, and electroconductivity is measured by an electroconductivity meter (HORIBA electroconductivity meter ES-14).

In the present invention, it is preferable to adjust a volume average particle size of a charge control agent within a range of from 0.1 to 20 $\mu$, preferably from 1 to 10 $\mu$m.

If the volume average particle size is less than 0.1 $\mu$m, the amount of the charge control agent appearing on the surface of a toner becomes very small, and the aimed effect of the charge control agent can not be achieved. On the other hand, if the volume average particle size is larger than 20 $\mu$m, an amount of a charge control agent dropped from a toner is increased, and a bad influence of polluting a copying machine is caused.

In the present invention, it is preferable to add a charge control agent in an amount of from 0.1 to 10 parts by weight, more preferably from 0.2 to 5 parts by weight, per 100 parts by weight of a binder resin.

The electrostatic image developing toner of the present invention basically comprises a binder resin, a coloring agent (such as a pigment, a dye and the like) and a charge control agent, and may further contain a release agent (such as wax), other additives (such as a cleaning-improving agent, a fluidity-improving agent and the like), and a magnetic material.

The charge control agent of the present invention may be used not only in a one-component toner but also in a two-component toner, and also may be used in a capsule toner and a polymer toner, and further may be used in a magnetic toner or a non-magnetic toner.

The electrostatic image developing toner of the present invention can be prepared in accordance with a well known conventional method. Examples of the preparation method include a method (pulverizing method) comprising melting a mixture of a binder resin, a charge control agent, a coloring agent and the like in a heat-mixing apparatus, kneading, pulverizing and classifying, a method comprising dissolving the above mixture, spraying to produce fine particles, drying and classifying, and a polymerization method comprising dispersing a coloring agent and a charge control agent in suspended monomer particles, and other methods.

The preparation method by the pulverizing method is described in more details hereinafter. A binder resin is uniformly mixed with a coloring agent, a charge control agent, a wax, and other additives. The mixing can be carried out by a well-known stirrer such as a Henschel mixer, a super mixer, a ball mill or the like. The mixture thus obtained is heat-melted and kneaded by a sealing type kneader or a mono-axial or two-axial extruder. The kneaded product is cooled, and is roughly pulverized by a crusher or a hammer mill, and further finely divided by a pulverizing machine such as a jet mill or a high-speed rotary type mill. The pulverized product is further treated by a air classifier such as a inertia type Elbowjet using a coanda effect, a cyclone (centrifugal) classification type Microplex, a DS separator and the like, to be classified into a predetermined particle size. Further, when a surface of a toner is treated by additives, the toner and additives are stirred and mixed by a high-speed stirrer such as a Henschel mixer, super mixer and the like.

Also, the toner of the present invention can be prepared by a suspension polymerization method. In the suspension polymerization method, a polymerizable monomer, a coloring agent, a polymerization initiator, a charge control agent, and optionally a crosslinking agent, and other additives are uniformly dissolved or dispersed to prepare a monomer composition, and the monomer composition is converted into a continuous phase containing a dispersion stabilizer, for example, by dispersing into an aqueous phase by an appropriate stirrer and a dispersing machine, such as a homomixer, a homogenizer, an atomizer, a microfluidizer, a one liquid fluid nozzle, a gas-liquid fluid nozzle, or an electric emulsifying machine. At the same time, a polymerization reaction is carried out to obtain toner particles having a desired particle size. The particles thus obtained can be treated with additives in accordance with the above-mentioned method.

The toner of the present invention can be prepared also by an emulsion polymerization method. As compared with the particles obtained by the above-mentioned suspension polymerization method, the emulsion polymerization method provides particles excellent in uniformity, but since the particles obtained by the emulsion polymerization method have a very small average particle size of from 0.1 to 1.0 $\mu$m, the emulsified particles may be used as nuclei and a polymerizable monomer may be added thereto to grow particles. That is, a seed polymerization method or a method of joining or melting emulsified particles to produce particles having an appropriate average particle size may be carried out.

According to these polymerization methods, it is not necessary to impart brittleness to toner particles since a pulverizing step is not employed, and it is possible to employ a large amount of a low softening point material which has been hardly used in a conventional pulverizing method, thus enabling a wide choice of a material to be used. Further, a coloring agent or a release agent which is a hydrophobic material is hardly exposed on the surface of toner particles, and it is therefore possible to reduce pollution of a toner-carrying member, a photosensitive material, a transfer roller and a fixer.

When the toner of the present invention is prepared by the above polymerization method, a faithful image productivity, a release property, a color reproductivity and other properties can be further improved, and in order to make responsive to minute dots, a toner particle size can be minimized, and a toner of minute particle size having a sharp particle size distribution can be relatively easily produced.

Hereinafter, concrete materials to be used for preparing an electrostatic image developing toner of the present invention are illustrated below.

As a binder resin, any of well known materials may be used, examples of which include a polymer having a vinyl polymer unit such as a styrene type monomer, an acryl type monomer, a methacryl type monomer or the like, and a copolymer of at least two kinds of these monomers, a polyester type polymer, a polycarbonate, and various rubber type polymers such as butadiene rubber.

Examples of a vinyl type monomer constituting a vinyl type polymer unit include styrene and its derivatives such as styrene, o-methylstyrene, m-methylstyrene, p-methylstyrene, p-phenylstyrene, p-ethylstyrene, 2,4-dimethylstyrene, p-n-atylstyrene, p-tert-butylstyrene, p-n-hexylstyrene, p-n-octylstyrene, p-n-nonylstyrene, p-n-decylstyrene, p-n-dodecylstyrene, p-methoxystyrene, p-chlorostyrene, 3,4-dichlorostyrene, m-nitrostyrene, o-nitrostyrene, p-nitrostyrene and the like; unsaturated monoolefins such as ethylene, propylene, butylene, isobutylene and the like; unsaturated polyenes such as butadiene, isoprene and the like; vinyl halides such as vinyl chloride, vinylidene chloride, vinyl bromide, vinyl fluoride, and the like; vinyl esters such as vinyl acetate, vinyl propionate, vinyl benzoate, and the like; $\alpha$-methylene aliphatic monocarboxylic acid esters such as methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, diethylaminoethyl methacrylate, and the like; acrylic acid esters such as methyl acrylate, ethyl acrylate, propyl acrylate, n-butyl acrylate, isobutyl acrylate, n-octyl acrylate, dodecyl acrylate, 2-ethylhexyl acrylate, stearyl acrylate, 2-chloroethyl acrylate, phenyl acrylate, and the like; vinyl ethers such as vinyl methyl ether, vinyl ethyl ether, vinyl isobutyl ether, and the like; vinyl ketones such as vinyl methyl ketone, vinyl hexyl ketone, methyl isopropenyl ketone, and the like; N-vinyl compounds such as N-vinyl pyrrhol, N-vinyl carbazole, N-vinyl indole, N-vinyl pyrrolidone, and the like; vinyl naphthalenes; and acrylic acid or methacrylic acid derivatives such as acrylonitrile, methacrylonitrile, acrylamide, and the like.

Further examples include an unsaturated dibasic acid such as maleic acid, citraconic acid, itaconic acid, alkenyl succinic acid, fumaric acid and mesaconic acid; an unsaturated dibasic anhydride such as maleic anhydride, citraconic anhydride and alkenylsuccinic anhydride; an unsaturated dibasic acid half ester such as methyl maleate half ester, ethyl maleate half ester, butyl maleate half ester, methyl citraconate half ester, ethyl citraconate half ester, butyl citraconate half ester, methyl itaconate half ester, methyl alkenyl-succinate half ester, methyl fumarate half ester and methyl mesaconate half ester; an unsaturated dibasic acid ester such as dimethyl maleate and dimethyl fumarate; an $\alpha$, $\beta$-unsaturated acid such as acrylic acid, methacrylic acid, crotonic acid and cinnamic acid; an $\alpha$, $\beta$-unsaturated acid anhydride such as crotonic anhydride and cinnamic anhydride; an anhydride of lower aliphatic acid and $\alpha$, $\beta$-unsaturated acid; and a carboxyl group-containing monomer such as an alkenylmalonic acid, an alkenylglutaric acid, an alkenyladipic acid, and their acid anhydrides and their monoesters.

Still further examples include acrylic or methacrylic acid esters such as 2-hydroxyethyl acrylate, 2-hydroxyethyl methacrylate and 2-hydroxypropyl methacrylate; and a hydroxy group-containing monomer such as 4-(1-hydroxy-1-methylbutyl)styrene and 4-(1-hydroxy-1-methylhexyl) styrene.

In the electrostatic image developing toner of the present invention, a vinyl type polymer unit of a binder resin may have a crosslinking structure crosslinked by a crosslinking agent having at least 2 vinyl groups, and examples of the crosslinking agent used therein include an aromatic divinyl compound such as divinyl benzene and divinyl naphthalene; and diacrylate compounds bonded with alkyl chains such as ethylene glycol diacrylate, 1,3-butylene glycol diacrylate, 1,4-butane diol diacrylate, 1,5-pentane diol diacrylate, 1,6-hexane diol diacrylate and neopentyl glycol diacrylate, and dimethacrylate derivatives of these compounds in which acrylate is replaced by methacrylate. Further examples include diacrylate compounds bonded with alkyl chains containing ether bonds such as diethylene glycol diacrylate, triethylene glycol diacrylate, tetraethylene glycol diacrylate, polyethylene glycol #400 diacrylate, polyethylene glycol #600 diacrylate and dipropylene glycol diacrylate, and dimethacrylate derivatives of these compounds in which acrylate is replaced by methacrylate. Still further examples include diacrylate compounds bonded with chains containing ether bonds and aromatic groups, such as polyoxyethylene(2)-2,2-bis(4-hydroxyphenyl)propane diacrylate, polyoxyethylene(4)-2,2-bis(4-hydroxyphenyl) propane diacrylate, and dimethacrylate derivatives of these compounds in which acrylate is replaced by methacrylate. Examples of polyester type diacrylates include trade name MANDA (manufactured by Nihon Kayaku K.K.), and the like.

Examples of a polyfunctional crosslinking agent include pentaerythritol triacrylate, trimethylolethane triacrylate, trimethylolpropane triacrylate, tetramethylolmethane tetraacrylate, oligoester acrylate, and their derivatives in which acrylate is replaced by methacrylate, triallyl cyanurate, triallyl trimellitate, and the like.

These crosslinking agents are used in an amount of from 0.01 to 10 parts by weight, preferably from 0.03 to 5 parts by weight, per 100 parts by weight of other monomer component.

Among these crosslinking monomers, an aromatic divinyl compound (particularly divinyl benzene) and a diacrylate compound bonded with a chain containing one ether bond and an aromatic group are preferable in view of fixing property and offset resistance of a toner resin.

Examples of a polymerization initiator used in the preparation of a vinyl type copolymer of the present invention include 2,2'-azobisisobutylonitrile, 2,2'-azobis(4-methoxy-2,4-dimethylvaleronitrile), 2,2'-azobis(-2,4-dimethylvaleronitrile), 2,2'-azobis(-2-methylbutylonitrile), dimethyl-2,2'-azobisisobutyrate, 1,1'-azobis(1-cyclohexanecarbonitrile), 2-(carbamoylazo)-isobutylonitrile, 2,2'-azobis(2,4,4,-trimethylpentane), 2-phenylazo-2,4-dimethyl-4-methoxyvaleronitrile, 2,2'-azobis(2-methyl-propane), methyl ethyl ketone peroxide, acetylacetone peroxide, cyclohexanone peroxide and other ketone peroxides, 2,2-bis(t-butylperoxy)butane, t-butyl hydroperoxide, cumene hydroperoxide, 1,1,3,3-tetramethylbutyl hydroperoxide, di-t-butyl peroxide, t-butylcumyl peroxide, dicumyl peroxide, α'-bis(t-butylperoxyisopropyl)benzene, isobutyl peroxide, octanoyl peroxide, decanoyl peroxide, lauroyl peroxide, 3,5,5-trimethylhexanoyl peroxide, benzoyl peroxide, m-trioleperoxide, di-isopropyl peroxydicarbonate, di-2-ethylhexyl peroxydicarbonate, di-n-propyl peroxydicarbonate, di-2-ethoxyethyl peroxycarbonate, di-ethoxyisopropyl peroxydicarbonate, di(3-methyl-3-methoxybutyl) peroxycarbonate, acetylcyclohexylsulfonyl peroxide, t-butyl peroxyacetate, t-butylperoxyisobutylate, t-butylperoxy-2-ethylhexalate, t-butylperoxylaurate, t-butyloxybenzoate, t-butylperoxyisopropylcarbonate, di-t-butylperoxyisophthalate, t-butylperoxyallylcarbonate, isoamylperoxy-2-ethylhexanoate, di-t-butylperoxyhexahydroterephthalate, t-butylperoxyazelate, and the like.

A vinyl type polymer has preferably a glass transition temperature of from 40 to 90° C., a number average molecular weight (Mn) of from 1,500 to 50,000 and a weight average molecular weight (Mw) of from 10,000 to 5,000,000, more preferably a glass transition temperature of from 45 to 85° C., a number average molecular weight of from 2,000 to 20,000 and a weight average molecular weight of from 15,000 to 3,000,000.

The vinyl type polymer has preferably an OH value of at most 50, more preferably an OH value of at most 30.

Examples of a monomer constituting a polyester type polymer include a dihydric alcohol component such as ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, hydrogenated bisphenol A, or an ether compound of bisphenol A with ethylene glycol or propylene glycol, and the like.

It is preferable also to use a trihydric or higher hydric alcohol in order to crosslink a polyester resin. Examples of the trihydric or higher hydric alcohol include sorbitol, 1,2,3,6-hexanetetrol, 1,4-sorbitan, pentaerythritol, dipentaerythritol, tripentaerythritol, 1,2,4-butanetriol, 1,2,5-pentatriol, glycerol, 2-methylpropanetriol, 2-methyl-1,2,4-butanetriol, trimethylolethane, trimethylolpropane, 1,3,5-trihydroxybenzene, and the like.

Examples of an acid component include benzene dicarboxylic acids such as phthalic acid, isophthalic acid and terephthalic acid or their anhydrides or their lower alkyl esters; alkyl dicarboxylic acids such as succinic acid, adipic acid, sebacic acid and azelaic acid or their anhydrides; unsaturated dibasic acids such as maleic acid, citraconic acid, itaconic acid, alkenyl succinic acid, fumaric acid and mesaconic acid; and unsaturated dibasic acid anhydrides such as maleic anhydride, citraconic anhydride, itaconic anhydride and an alkenyl succinic anhydride. Also, examples of a trivalent or higher polycarboxylic acid component include trimellitic acid, pyromellitic acid, 1,2,4-benzenetricarboxylic acid, 1,2,5-benzenetricarboxylic acid, 2,5,7-nephthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, tetra (methylenecarboxyl)methane, 1,2,7,8-octanetetracarboxylic acid and embole trimer acid, and their anhyrides, and their lower alkyl esters.

A polyester resin obtained after polymerization has preferably a glass transition point of from 40 to 90° C., a number average molecular weight (Mn) of from 1,500 to 50,000 and a weight average molecular weight (Mw) of from 10,000 to 5,000,000, more preferably a glass transition point of from 45 to 85° C., a number average molecular weight of from 2,000 to 20,000 and a weight average molecular weight of from 15,000 to 3,000,000.

Also, the resin has preferably an OH value of at most 50, more preferably at most 30.

In the present invention, a vinyl type copolymer component and/or a polyester resin component preferably contain a monomer component reactive with the both resin components. Among monomers constituting the polyester resin component, examples of a monomer reactive with the vinyl type copolymer include an unsaturated dicarboxylic acid such as phthalic acid, maleic acid, citraconic acid and itaconic acid, or their anhydrides. Examples of a monomer constituting the vinyl type copolymer component include a material having a carboxyl group or a hydroxyl group, acrylic acid or methacrylic acid esters, and the like. A binder resin such as the polyester type polymer or the vinyl type polymer has preferably an acid value of from 5 to 50, more preferably an acid value of from 6 to 45.

Also, a mixture of at least two kinds of different binder resins may be used, and in such a case, the mixture preferably contains a resin having an acid value of from 5 to 50 in an amount of at least 60 wt %.

As a coloring agent, a black toner contains generally a black or blue dye or pigment particles for a two-component developer and a non-magnetic one-component developer, and contains various magnetic materials for a magnetic one-component developer.

Examples of the black or blue pigment include carbon black, aniline black, acetylene black, phthalocyanine blue, indanthrene blue, and the like.

Examples of the black or blue dye include an azo type dye, an anthraquinone type dye, a xanthene type dye, a methine type dye, and the like.

In any case, the coloring agent is used in an amount necessary to maintain a desired optical reflective density of an image after fixing, and is used in an amount of from 0.1 to 20 parts by weight, preferably from 2 to 12 parts by weight, per 100 parts by weight of a resin.

Examples of a material used as a magnetic material for coloring purpose include a metal fine powder of iron, nickel, cobalt or the like, an alloy of a metal such as iron, lead, magnesium, antimony, beryllium, bismuth, cadmium, calcium, manganese, selenium, titanium, tungsten, vanadium, cobalt, copper, aluminum, nickel, zinc or the like, a metal oxide such as aluminum oxide, iron oxide, titanium oxide or the like, a ferrite of iron, manganese, nickel, cobalt, zinc or the like, a nitride such as vanadium nitride, chromium nitride or the like, a carbide such as tungsten carbide, silicon carbide or the like, and their mixtures. As a magnetic material, an iron oxide such as magnetite, hematite or ferrite is preferable. These magnetic materials have a large influence on the chargeability of a toner, but a charge control agent of the present invention provides a satisfactory charging performance regardless of these magnetic materials.

The toner of the present invention may further contain a different other charge control agent to further stabilize the chargeability, if necessary, and the total amount of charge control agents is preferably from 0.1 to 10 parts by weight, more preferably from 0.2 to 5 parts by weight, per 100 parts by weight of a binder resin.

Examples of the different other charge control agents include an organic metal complex, a chelate compound, an organic metal salt or the like as a charge control agent for negative chargeability, more concrete examples of which include a monoazometal complex, a metal complex or a metal salt of an aromatic hydroxy carboxylic acid, an aromatic dicarboxylic acid compound or the like, and further an aromatic hydroxy carboxylic acid, an aromatic mono- and polycarboxylic acid, their anhydride, and their esters, and phenol derivatives of bisphenol, and the like. Also, in order to improve stability, the toner may further contain a charge control agent for positive chargeability in combination, examples of which include a nigrosine dye, an azine dye, a triphenylmethane type dye, a quaternary ammonium salt, a resin having a quaternary ammonium salt in a side chain, and the like.

When the toner of the present invention is used as a magnetic toner, examples of a magnetic material to be contained in the magnetic toner include an iron oxide such as magnetite, hematite or ferrite, and an iron oxide containing other metal oxides; a metal such as Fe, Co or Ni, or alloys of these metals with a metal such as Al, Co, Cu, Pb, Mg, Ni, Sn, Zn, Sb, Be, Bi, Cd, Ca, Mn, Se, Ti, W or V, and their mixtures.

More concrete examples of the magnetic material include triiron tetroxide ($Fe_3O_4$), diiron trioxide ($\gamma$-$Fe_2O_3$), zinc iron oxide ($ZnFe_2O_4$), yttrium iron oxide ($Y_3Fe_5O_{12}$), cadmium iron oxide ($CdFe_2O_4$), gadolinium iron oxide ($Gd_3Fe_5O_{12}$), copper iron oxide ($CuFe_2O_4$), lead iron oxide ($PbFe_{12}O$), nickel iron oxide ($NiFe_2O_4$), neodymium iron oxide ($NdFe_2O$), barium iron oxide ($BaFe_{12}O_{19}$), magnesium iron oxide ($MgFe_2O_4$), manganese iron oxide ($MnFe_2O_4$), lanthanum iron oxide ($LaFeO_3$), iron powder (Fe), cobalt powder (Co), nickel powder (Ni), and the like. The above magnetic materials may be used alone or in a mixture of two or more. Particularly preferable magnetic materials are fine powders of triiron tetroxide or $\gamma$-diiron trioxide.

These ferromagnetic materials have an average particle size of from 0.1 to 2 $\mu$m (preferably from 0.1 to 0.5 $\mu$m), and preferably have magnetic properties under application of 10K oersted of a coercive force of from 20 to 150 oersted, a saturation magnetization of from 50 to 200 emu/g (preferably from 50 to 100 emu/g) and a residual magnetization of from 2 to 20 emu/g.

The magnetic materials are used in an amount of from 10 to 200 parts by weight, preferably from 20 to 150 parts by weight, per 100 parts by weight of a binder resin.

In addition to a magnetic material, a magnetic toner may further contain a coloring agent such as carbon black, titan white, or other pigments and/or dyes. For example, when the toner of the present invention is used as a magnetic color toner, examples of a dye to be used include C.I. Direct Red 1, C.I. Direct Red 4, C.I. Acid Red 1, C.I. Basic Red 1, C.I. Mordant Red 30, C.I. Direct Blue 1, C.I. Direct Blue 2, C.I. Acid Blue 9, C.I. Acid Blue 15, C.I. Basic Blue 3, C.I. Basic Blue 5, C.I. Mordant Blue 7, C.I. Direct Green 6, C.I. Basic Green 4, C.I. Basic Green 6, and the like, and examples of a pigment to be used include Mineral Fast Yellow, Naple Yellow, Naphthol Yellow S, Hansa Yellow G, Permanent Yellow NCG, Tert Razin Lake, Molybdenum Orange, Permanent Orange GTR, Pyrazolone Orange, Benzidine Orange G, Cadmium Red, Permanent Red 4R, Watching Red Calcium Salt, Eosine Lake, Brilliant Carmine 3B, Manganese Violet, Fast Violet B, Methylviolet Lake, Cobalt Blue, Alkali Blue Lake, Victoria Blue Lake, Phthalocyanine Blue, First Sky Blue, Indanthrene Blue BC, Pigment Green B, Malachite Green Lake, Final Yellow Green G, and the like.

When the toner of the present invention is used as a non-magnetic toner for two-component full color, the following coloring agents may be used.

Examples of a magenta-coloring pigment include C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 49, 50, 51, 52, 53, 54, 55, 57, 58, 60, 63, 64, 68, 81, 83, 87, 88, 89, 90, 112, 114, 122, 123, 163, 202, 206, 207 and 209, C.I. Pigment Violet 19, C.I. Bat Red 1, 2, 10, 13, 15, 23, 29 and 35, and the like.

The above pigments may be used alone, but it is preferable to use them in combination with a dye to improve a clarity in view of an image quality of full color image.

Examples of a magenta dye to be used include an oil-soluble dye such as C.I. Solvent Red 1, 3, 8, 23, 24, 25, 27, 30, 49, 81, 82, 83, 84, 100, 109 and 121, C.I. Disperse Red 9, C.I. Solvent Violet 8, 13, 14, 21 and 27, C.I. Disperse Violet 1, and the like, a basic dye such as C.I. Basic Red 1, 2, 9, 12, 13, 14, 15, 17, 18, 22, 23, 24, 27, 29, 32, 34, 35, 36, 37, 38, 39 and 40, C.I. Basic Violet 1, 3, 7, 10, 14, 15, 21, 25, 26, 27 and 28, and the like.

Examples of a cyan coloring pigment to be used include C.I. Pigment Blue 2, 3, 15, 16 and 17, C.I. Bat Blue 6, C.I. Acid Blue 45, or a Copper Phthalocyanine Pigment having from 1 to 5 phthaloimidemethyl groups substituted on a phthalocyanine structure.

Examples of a yellow coloring pigment to be used include C.I. Pigment Yellow 1, 2, 3, 4, 5, 6, 7, 10, 11, 12, 13, 14, 15, 16, 17, 23, 65, 73 and 83, C.I. Bat Yellow 1, 3 and 20, and the like.

These coloring agents are used in a non-magnetic toner in an amount of from 0.1 to 60 parts by weight, preferably from 0.5 to 50 parts by weight, per 100 parts by weight of a binder resin.

Examples of a release agent used to improve a fixing property include a low molecular weight polyalkylene, a low molecular weight polypropylene, a low molecular weight polyethylene, a paraffin wax, and their derivatives, microcrystalline wax and their derivatives, Fischer-Tropsch wax and their derivatives, polyolefin wax and their derivatives, terpene resin and their derivatives, carnauba wax and their derivatives, and these derivatives include an oxide, a block copolymer with a vinyl type monomer, a graft-modified material, and the like.

In order to more effectively achieve the effect provided by adding wax in from a low temperature zone to a high temperature zone, the toner may contain at least two kinds of waxes.

In such a case, the wax to be used preferably has at least two heat-absorbing peaks measured by differential thermal analysis (DSC), and a peak of the highest heat-absorbing amount is present preferably at a lower temperature side than a peak of a second highest peak. As such a wax, a combination of at least two kinds of waxes having respectively different heat-absorbing peaks may be used, and a mixture having at least two DSC peaks may be used as a wax.

The wax preferably has two heat-absorbing peaks measured by DSC, and the two peaks preferably have a temperature difference of from 5 to 15° C. If the temperature difference is less than 5° C., the above-mentioned effect can be hardly achieved, and if the temperature difference exceeds 15° C., a low temperature side component provides an unpreferable influence on storage properties or a high temperature side component provides an unfavorable influence on fixing properties. Also, if the temperature difference between two heat-absorbing peaks is too large, dispersibility and liberation properties of the both components in the toner are different, and such a toner having a small particle size as used in the present invention suffers from an unpreferable dispersion influence of ununiform wax components, thereby adversely affecting a charging performance.

Such a wax includes a compound represented by the following formula (8) (wherein R is a hydrocarbon group and Y is a hydroxyl group, a carboxyl group, an alkylether group, an ester group or a sulfonyl group) having a weight average molecular weight (Mw) of at most 3,000 measured by GPC (gel permeation chromatography). Formula 8

$$R-Y \tag{8}$$

Examples of the compound include
(A) $CH_3(CH_2)_nCH_2OH$ (n=about 20 to about 1,300)
(B) $CH_3(CH_2)_nCH_2COOH$ (n about 20 to about 300)
(C) $CH_3(CH_2)_nCH_2OCH_2(CH_2)_mCH_3$ (n=about 20 to about 200, m=0 to about 100). The above compounds (B) and (C) are derivatives of the compound (A), and the main chain is a linear chain-like saturated hydrocarbon. In addition to the above illustrated examples, any compound derived from the above compound (A) may be used.

Among the above compounds, a wax comprising a high molecular alcohol represented by the above compound (A) as the main component achieves a satisfactory effect and is preferable. The above wax provides a satisfactory sliding property and particularly an excellent offset resistance. Also, when a toner is prepared so as to have a smaller particle size, it becomes important to disperse a wax uniformly, but the above wax has a coaction with a binder resin in the toner, and can be uniformly dispersed in the toner since the above wax itself does not have a high crystallinity.

These wax are used preferably in an amount of from 0.5 to 20 parts by weight per 100 parts by weight a binder resin.

Further, the toner of the present invention may contain a fluidity-improving agent. By adding the fluidity-improving agent to the surface of the toner, a fluidity is increased as compared before and after adding the fluidity-improving agent. Examples of the fluidity-improving agent include a fluorine type resin powder such as vinylidene fluoride fine powder, polytetrafluoroethylene fine powder or the like, a silica fine powder such as wet process-produced silica or dry process-produced silica, a titanium oxide fine powder, an alumina fine powder, and a treated silica, a treated titanium oxide or a treated alumina which is surface-treated with a silane coupling agent, a titanium coupling agent or a silicone oil.

Examples of a preferable fluidity-improving agent include fine powders produced by vapor phase oxidation of a silicon halide compound such as dry process-produced silica or fumed silica. For example, such silica can be obtained by thermal decomposition oxidation reaction of silicon tetrachloride gas in oxyhydrogen flame as illustrated by the following reaction formula.

$$SiCl_4 + 2H_2 + O_2 \rightarrow SiO_2 + 4HCl$$

In the above preparation step, it is possible to obtain a composite fine powder of silica and other metal oxides by using a silicon halide in combination with other metal halide compounds such as aluminum chloride or titanium chloride, and the term "silica" includes them. A silica fine powder to be used preferably has an average primary particle size in a range of from 0.001 to 2 μm, more preferably in a range of from 0.002 to 0.2 μm.

A silica fine powder produced by vapor phase oxidation of silicon halide is commercially available under the following trade names: AEROSIL 130 (manufactured by Nihon Aerosil K.K.), AEROSIL 200 (manufactured by Nihon Aerosil K.K.), AEROSIL 300 (manufactured by Nihon Aerosil K.K.), AEROSIL 380 (manufactured by Nihon Aerosil K.K.), AEROSIL TT600 (manufactured by Nihon Aerosil K.K.), AEROSIL MOX170 (manufactured by Nihon Aerosil K.K.), AEROSIL MOX80 (manufactured by Nihon Aerosil K.K.), AEROSIL COK84 (manufactured by Nihon Aerosil K.K.), Ca-O-SiL M-5 (manufactured by CABOT Co.), Ca-O-SiL MS-7 (manufactured by CABOT Co.), Ca-O-SiL MS-75 (manufactured by CABOT Co.), Ca-O-SiL HS-5 (manufactured by CABOT Co.), Ca-O-SiL EH-5 (manufactured by CABOT Co.), Wacker HDK N20 V15 (manufactured by WACKER-CHEMIEGMBH), N20E (manufactured by WACKER-CHEMIEGMBH), T30 (manufactured by WACKER-CHEMIEGMBH), T40 (manufactured by WACKER-CHEMIEGMBH), D-C Fine-Silica (Dow Corning Co.), Fransol (Fransil Co.), and the like.

Further, a treated silica fine powder of the above silicon halide compound obtained by gas phase oxidation of the silicon halide compound and subjected to hydrophobic treatment is more preferable. Still further, among the treated silica fine powders, a silica fine powder treated so as to have a hydrophobicity (hydrophobic degree) of in a range of from 30 to 80 measured by methanol titration test is particularly preferable.

The hydrophobic treatment is carried out by chemically treating a silica fine powder with an organic silica compound reactive or physically adsorptive with the silica fine powder. As a preferable treatment process, a silica fine powder obtained by subjecting a silica halide compound to vapor phase oxidation is treated with an organic silicon compound.

Examples of the organic silicon compound include hexamethyldisilane, trimethylsilane, trimethylchlorosilane, trimethylethoxysilane, dimethyldichlorosilane, methyltrichlorosilane, allyldimethylchlorosilane, allylphenyldichlorosilane, benzyldimethylchlorosilane, bromomethyldimethylchlorosilane, α-chloroethyltrichlorosilane, ρ-chloroethyltrichlorosilane, chloromethyldimethylchlorosilane, triorganosilylmercaptan, trimethylsilylmercaptan, triorganosilylacrylatevinyldimethylacetoxysilane, dimethylethoxysilane, dimethyldimethoxysilane, diphenyldiethoxysilane, hexamethyldisiloxane, 1,3-divinyltetramethyldisiloxane, 1,3-diphenyltetramethyldisiloxane and dimethylpolysiloxane having 2 to 12 siloxane units per molecule and also having a hydroxyl group bonded respectively to one Si in the terminal. A further example includes a silicone oil such as dimethylsilicone oil. They are used respectively alone or in a mixture of two or more.

A fluidity-improving agent having a specific surface area of at least 30 m$^2$/g, preferably at least 50 m$^2$/g, measured on the basis of nitrogen adsorption measured by BET method, provides a satisfactory result. The fluidity-improving agent is used preferably in an amount of from 0.01 to 8 parts by weight, more preferably in an amount of 0.1 to 4 parts by weight, per 100 parts by weight of a toner.

The electrostatic image developing toner of the present invention may further contain other additives such as various metal soaps, a fluorine type surfactant, dioctyl phthalate and the like, in order to protect a photosensitive material and a carrier, to improve a cleaning property, to adjust thermal, electric or physical properties, to adjust a resistance, to adjust a softening point, to improve a fixing rate, or the like, and may further include an electroconductivity-imparting agent such as tin oxide, zinc oxide, carbon black and antimony oxide, and inorganic fine powders such as titanium oxide, aluminum oxide and alumina, and the like. Also, these inorganic fine powders may be optionally subjected to hydrophobic treatment.

Also, the toner may further contain a lubricant such as Teflon, zinc stearate, or vinylidene polyfluoride, an abradant such as cesium oxide, silicon carbide or strontium titanate, an anti-caking agent, and a development-improving agent such as black fine particles and white fine particles having a reverse polarity to the toner particles in a small amount.

In order to control a charging amount, these additives are preferably treated with various treating agents including a silicone varnish, various modified silicone varnishes, a silicone oil, various modified silicone oils, a silane coupling agent, a silane coupling agent having a functional group, and other organic silicon compounds or the like.

A toner and the above-mentioned additives are fully mixed and stirred by a mixer such as a Henschel mixer, a ball mill or the like to have the surface of toner particles uniformly treated with the above additives, thereby obtaining a desired electrostatic image developing toner.

The charge control agent of the present invention is thermally stable and can retain a stable chargeability without being susceptive to a thermal change. Also, since it is uniformly dispersed in any binder resin, a charge distribution of a fresh toner becomes very uniform, and the toner of the present invention including untransferred and recovered toner (used toner) does not provide a substantial change in a saturated tribo-charged amount and a charge distribution as compared with a fresh toner. When a used toner provided from the electrostatic image developing toner of the present invention is reused, it is possible to further make a difference between the fresh toner and the used toner smaller by preparing a toner using a polyester resin including an aliphatic diol as a binder resin or a metal-crosslinked styrene-acryl copolymer as a binder resin and also using a large amount of polyolefin added thereto.

When using a toner of the present invention as a two-component developer, examples of a carrier to be used include fine glass beads, iron powder, ferrite powder, nickel powder, a binder type carrier of resin particles having magnetic particles dispersed therein, and a resin-coated carrier, the surface of the carrier of which is coated with a polyester type resin, a fluorine type resin, a vinyl type resin, an acryl type resin or a silicone type resin.

The carrier thus used has a particle size in a range of from 4 to 200 μm, preferably from 10 to 150 μm, more preferably from 20 to 100 μm.

In the two-component developer, a toner is used preferably in an amount of from 1 to 200 parts by weight per 100 parts by weight of a carrier, and more preferably a toner is used in an amount of from 2 to 50 parts by weight per 100 parts by weight of a carrier.

The toner of the present invention can be used in a one-component developing system which is another image-forming method. The one-component developing system means a developing unit of a method comprising coating a toner on the surface of a toner-carrying material called as a developing roller and developing in contact with or in non-contact with the surface of a photosensitive material. In such a case, the toner may be magnetic or non-magnetic. The developing roller may comprises a material, the resistance of which is controlled in a medium resistance zone so as to maintain an electric field while preventing a conductivity to the surface of a photosensitive material, or a thin layer of dielectric layer may be provided on the surface layer of an electroconductive roller. Further, there may be employed a developing system using an electroconductive resin sleeve having an insulating material coated on the side faced to the surface of a photosensitive material on an electroconductive roller or an insulating sleeve having an electroconductive layer provided on the side not faced to a photosensitive layer.

When the toner of the present invention is used for one-component contact developing method, the surface of a roller carrying the toner may be rotated in the same direction of peripheral velocity as that of a photosensitive material, or may be rotated in the reverse direction. If a peripheral velocity ratio (roller peripheral velocity/photosensitive material peripheral velocity) becomes higher, an amount of toner supplied to a developing part becomes larger and the toner is more frequently adsorbed and desorbed to a latent image. By repeating to remove the toner on an unnecessary part and to supply the toner to a necessary part, a latent image is faithfully developed, and in such a system, the peripheral velocity ratio is preferably required to be higher.

The toner of the present invention can be used also in a system wherein a toner-carrying material and an electrostatic latent image-holding material are in non-contact with each other, and the toner may be magnetic or non-magnetic. Usually, when developing in the non-contact state, development is carried out by flying the toner between a certain distance space, and it is therefore necessary to produce an electric field between the developer and the latent image-holding material. In such a case, it is usual to apply a direct current electric field, but it is also possible to apply an alternating current in order to make a clear image satisfactorily developed at edge parts and to satisfactorily develop a solid image.

When employing one-component developing system as a developing system using the toner of the present invention, a stiff roller may be used as a toner-carrying material, and a photosensitive material can be made flexible like a belt, or an elastic roller may be used. When using a developing roller of electroconductive material as a toner-carrying material, the developing roller has a resistivity preferably in a range of from $10^1$ to $10^{12}$ Ω·cm, more preferably in a range of from $10^2$ to $10^9$ Ω·cm.

Further, in the development of the toner of the present invention, it is preferable to coat the surface of the toner-carrying material with a resin layer having electroconductive fine particles and/or a lubricant dispersed in order to control a total charge amount of the toner.

A two-component developing system of using the toner of the present invention is concretely described hereinafter. The two-component developing system employs a toner and a carrier (having functions as a charge-imparting material and a toner-conveying material), and examples of the carrier used include a magnetic material, glass beads and the like. By stirring a developer (a toner and a carrier) by a developer-stirring element, a predetermined charge amount is generated and is conveyed by a magnet roller to a part where development is carried out. By a magnetic force of the magnet roller, the developer is retained on the surface of the roller, and the developer is formed into a layer of appropriate height restricted by a developer-restricting plate forming a magnetic brush. The developer moves on the roller in accordance with rotation of a developing roller in a contact state with an electrostatic latent image-holding material or in non-contact state at a predetermined distance so as to be faced to the electrostatic latent image-holding material, and the latent image is developed into a visible image. In the development in the non-contact state, it is usual to produce a direct current electric field between the developer and the latent image-holding material, thereby providing a driving force for flying the toner between a predetermined distance space, or an alternating current field may be produced in order to make a clearer image.

A preferable embodiment of a photosensitive material used in an image-forming apparatus to be used for the electrostatic image developing toner of the present invention is illustrated below.

Examples of an electroconductive substrate include a metal such as aluminum or stainless steel, a plastic having a coating layer of an aluminum alloy, an indium oxide-tin oxide alloy or the like, a plastic or paper having electroconductive particles impregnated, a plastic having an electroconductive polymer, and the like, and the electroconductive substrate may be used in a cylindrical form or a film form.

These electroconductive substrates may be provided with an undercoat layer in order to improve a coating property or adhesiveness of a photosensitive layer, to protect the substrate, to cover a defect present on the substrate, to improve a charge-introducing property from a black material, or to prevent a photosensitive layer from being electrically destroyed. Examples of the undercoat layer include polyvinyl alcohol, poly-N-vinyl imidazole, polyethylene oxide, ethyl cellulose, methyl cellulose, nitrocellulose, ethylene-acrylic acid copolymer, polyvinyl butyral, phenol resin, casein, polyamide, copolymerized nylon, glue (hydoglue), gelatin, polyurethane, aluminum oxide and the like. The undercoat layer usually has a thickness of from 0.1 to 10 μm, preferably from 0.1 to 3 μm.

A charge-generating layer is formed by coating a charge-generating material dispersed in an appropriate binder or vapor-depositing, the charge-generating material of which include an azo type pigment, a phthalocyanine type pigment, an indigo type pigment, a perylene type pigment, a polycyclic quinone type pigment, a squarilium dye, a pyrylium salt, a thiopyrylium salt, a triphenylmethane type dye, and an inorganic material such as selenium or amorphous silicon. Among them, a phthalocyanine type pigment is preferable. The binder is used in an amount of at most 80 wt %, preferably from 0 to 40 wt %, to the charge-generating layer. Also, the charge-generating layer has a film thickness of at most 5 μm, preferably from 0.05 to 2 μm.

A charge-transporting layer has a function of receiving a charge carrier from a charge-generating layer under electric field and transporting the charge carrier. The charge-transporting layer is formed by dissolving a charge-transporting material in a solvent, optionally together with a binder resin, and coating, and its film thickness is generally from 5 to 40 μm. Examples of the charge-transporting material include a polycyclic aromatic compound having a structure of biphenylene, anthracene, pyrene or phenanthrene in the main chain or in a side chain, a nitrogen-containing cyclic compound such as indole, carbazole, oxadiazole or pyrazoline, a hydrazone compound, a styryl compound, selenium, selenium-tellurium, amorphous silicon or cadmium sulfide, and the like.

Examples of a binder resin having these charge-transporting material dispersed therein, include a resin such as polycarbonate resin, polyester resin, polymethacrylic acid ester, polystyrene resin, acryl resin or polyamide resin, and an organic photoconductive polymer such as poly-N-vinyl carbazole or polyvinyl anthracene, and the like.

Further, a protective layer may be provided as a surface layer. Examples of a resin used as the protective layer include polyester, polycarbonate, acryl resin, epoxy resin and phenol resin, or these resins are used in combination with one or two or more curing agents. Also, electroconductive fine particles may be dispersed in a resin of the protective layer. Examples of the electroconductive fine particles include a metal, a metal oxide and the like. Preferably ultra-fine particles of zinc oxide, titanium oxide, tin oxide, antimony oxide, indium oxide, bismuth oxide, tin oxide-coated titanium oxide, tin-coated indium oxide, antimony-coated tin oxide, zirconium oxide or the like. They may be used alone or in a mixture of two or more. Generally, when dispersing particles in a protective layer, it is necessary for preventing scattering of an incident light by dispersion particles to employ dispersion particles having a particle size smaller than a wavelength of the incident light, and it is preferable to use electroconductive or insulating particles having a particle size of at most 0.5 μm to be dispersed in the protective layer. Also, the particles are used preferably in an amount of from 2 to 90 wt %, more preferably from 5 to 80 wt %, to the total weight of the protective layer. The protective layer has preferably a film thickness of from 0.1 to 10 μm, more preferably from 1 to 7 μm.

Coating of a surface layer is carried out by spray-coating, beam-coating or dip-coating a resin dispersion.

As a charging method for these photosensitive materials, a well known corona-charging method such as corotron or scorotron may be used, or a method of using a pin electrode may also be used. Further, a direct-charging method as described below can also be used. As the direct-charging method, there are a method of using a charging blade and a method of using an electroconductive brush. These contact-charging methods provide an advantage of not using a high electric voltage and an effect of reducing generation of ozone.

When using a roller or a blade as a direct-charging element of a photosensitive material, a metal such as iron, copper or stainless steel, a resin having carbon dispersed or a resin having a metal or a metal oxide dispersed, and the like are used as an electroconductive substrate, and its shape to be used is bar-like or plate-like. For example, when using an elastic roller having an elastic layer, an electroconductive layer and a resistance layer provided on an electroconductive substrate, the elastic layer of the elastic roller may be formed from a rubber or a sponge of chloroprene rubber, isoprene rubber, EPDM rubber, polyurethane rubber, epoxy rubber, butyl rubber or the like, or a thermoplastic elastomer such as styrene-butadiene thermoplastic elastomer, polyurethane type thermoplastic elastomer, polyester type thermoplastic elastomer, ethylene-vinyl acetate thermoplastic elastomer or the like, and the electroconductive layer has a volume resistivity of at most $10^7$ Ω·cm preferably at most 10 Ω·cm. For example, a metal vapor-deposition film, an electroconductive particle-dispersing resin, an electroconductive resin or the like is used, and examples of the metal vapor-deposition film include a vapor-deposition film of aluminum, indium, nickel, copper or iron, and examples of the electroconductive particle-dispersing resin include a resin of urethane, polyester, vinyl acetate-vinyl chloride copolymer or polymethyl methacrylate, having electroconductive particles of carbon, aluminum, nickel or titanium oxide dispersed. Examples of the electroconductive resin include quaternary ammonium salt-containing polymethyl methacrylate, polyvinyl aniline, polyvinyl pyrrole, polydiacetylene, polyethyleneimine and the like. The resistance layer is for example a layer having a volume resistivity of $10^6$ to $10^{12}$ Ω·cm, and a semiconductive resin, an electroconductive particle-dispersing insulating resin or the like may be used. Examples of the semiconductive resin include ethyl cellulose, nitrocellulose, methoxymethylated nylon, ethoxymethylated nylon, copolymerized nylon, polyvinyl hydrin, casein and the like. Examples of the electroconductive particle-dispersing resin include an insulating resin of urethane, polyester, vinyl acetate-vinyl chloride copolymer or polymethyl methacrylate, having electroconductive particles of carbon, aluminum, indium oxide or titanium oxide dispersed in a small amount.

A brush used as the charging element is prepared by dispersing an electroconductive material in generally used fibers to adjust a resistance. Examples of the fibers include generally known fibers such as nylon, acryl, rayon, polycarbonate, polyester or the like. Also, examples of the electroconductive material include electroconductive powders of generally known electroconductive materials such as a metal of copper, nickel, iron, aluminum, gold or silver, or a metal oxide of iron oxide, zinc oxide, tin oxide, antimony oxide or titanium oxide, and carbon black. If necessary, these electroconductive powders may be surface-treated by hydrophobic treatment or resistivity-adjusting treatment. The electroconductive powders to-be used are selected in view of productivity and dispersibility in fibers. The brush is prepared preferably so as to have a fiber thickness of from 1 to 20 denier (fiber diameter: from 10 to 500 μm), a fiber length of from 1 to 15 mm and a brush density of from 10,000 to 300,000 filaments per $inch^2$ (from 1.5×100 to 4.5×100 filaments per $cm^2$).

An image-forming method applicable for the electrostatic image developing toner of the present invention is concretely described hereinafter with regard to a transferring step.

The transfer is carried out by electrostatically transferring an image to be developed to a transfer material by using a photosensitive material and a transfer material in a contact or non-contact state.

The non-contact transferring method employs a transferring step by a well known corona charging method such as corotron or scorotron.

The contact transferring method employs a transferring roller or an apparatus having a transferring belt as transferring means. The transferring roller comprises at least a mandrel and an electroconductive elastic layer, and the electroconductive elastic layer employs an elastomer having a resistivity of from $10^1$ to $10^{10}$ Ω·cm such as urethane or EPDM and having an electroconductive material such as carbon dispersed therein.

The electrostatic image developing toner of the present invention is particularly effective for an image-forming apparatus employing an organic compound on the surface of a photosensitive material. Generally, when the surface layer of a photosensitive material is formed by an organic compound, a transferring performance tends to be lowered as compared with a photosensitive material using an inorganic material since the organic compound surface layer has a stronger adhesiveness to toner particles, but since the toner of the present invention has an excellent charge controlling effect, a remaining amount of transferred toner is very small and a transferring efficiency is excellent.

Examples of the surface material of a photosensitive material employed in an image-forming apparatus applicable for the electrostatic image developing toner of the present invention, include silicone resin, vinylidene chloride, ethylene-vinyl chloride, styrene-acrylonitrile, styrene-methylmethacrylate, styrene, polyethylene terephthalate and polycarbonate, but are not limited thereto, and other monomers or copolymers and blends of the above illustrated binder resins are also usable.

The toner of the present invention is also useful for an image-forming apparatus employing a photosensitive material of small size having a diameter of at most 50 mm.

Also, when forming a color image, a well-known intermediate transferring belt is usable as a color-overlapping means.

As a cleaning element, a blade, a roller, a fur brush, a magnetic brush or the like can be used in an image-forming apparatus applicable for the electrostatic image developing toner of the present invention. These cleaning elements may be used in a combination of two or more kinds.

Various methods may be used as a method for cleaning an electrostatic image-holding material in an image-forming apparatus applicable for the electrostatic image developing toner of the present invention. An efficient blade cleaning method may be employed, but as a means for simply improving a cleaning defect by a toner, there is illustrated a method for appropriately controlling without excessively raising a charge of untransferred toner remained on a photosensitive material.

Also, it is preferable to impart a release property to the surface of a photosensitive material used in an image-forming apparatus applicable for the electrostatic image developing toner of the present invention, and it is preferable to make the surface of a photosensitive material so as to have a contact angle of at least 85° to water. More preferably, the surface of a photosensitive material has a contact angle of at least 90° to water. The photosensitive material surface having such a high contact angle means to have a high release property, and due to this effect, a toner amount remained after transferring can be remarkably reduced, and a load of cleaning can be largely reduced. Thus, by using the toner of the present invention, generation of a cleaning defect can be surely prevented.

The image-forming apparatus applicable for the electrostatic image developing toner of the present invention is useful also in a case of using a photosensitive material having a surface mainly composed of a high molecular binder resin. For example, an image-forming apparatus is useful in a case of using an inorganic photosensitive material such as selenium or amorphous silicon, on the surface of which a protective film mainly composed of a resin is provided, a case of having a surface layer composed of a resin and a charge-transporting material as a charge-transporting layer of a function-separation type organic photosensitive material, and a case of having a protective layer further provided thereon. A means for imparting a release property to such a surface layer comprises using a resin having a low surface energy for constituting a film, adding an additive of imparting water repellency or lipophilic nature, or dispersing a material having a high release property. More concrete means comprises introducing a fluorine-containing group, a silicon-containing group or the like into a structure of a resin, adding a surfactant or the like, or forming a surface layer of a fluorine atom-containing compound such as polyethylene fluoride, polyvinylidene fluoride, carbon fluoride or the like. By employing these means, it is possible to produce a photosensitive material surface having a contact angle of at least 85° to water. If the contact angle is less than 85°, a toner and a toner-carrying material are hardly endurable and tend to be degraded. Among these means, it is particularly preferable to employ polyethylene fluoride, and it is preferable to disperse a release property-imparting powder such as a fluorine-containing resin into an outermost surface layer. The incorporation of the powder into the surface can be carried out by providing a layer having the powder dispersed in a binder resin on the outermost surface of a photosensitive material, or by dispersing the powder directly in the outermost surface layer without providing a new surface layer in a case of an organic photosensitive material mainly composed of a resin.

An amount of the powder to be incorporated into the surface layer is preferably adjusted so as to provide an appropriate sensitivity suitable in the present invention.

Examples of a binder resin include polycarbonate resin, polyester resin, polyvinyl butyral resin, polystyrene resin, acryl resin, methacrylic resin, phenol resin, silicone resin, epoxy resin, vinyl acetate resin and the like. An amount of the release property-imparting powder is preferably from 1 to 60 wt %, more preferably from 2 to 50 wt %, to the total weight of a charge-generating layer and a surface layer. If the amount of the powder is less than 1 wt %, an amount of a toner remained after transferring is not sufficiently reduced, and a cleaning efficiency of the toner remained after transferring is not satisfactory, and accordingly an effect of preventing a ghost is not satisfactory. On the other hand, if the amount of the powder is higher than 60 wt %, a strength of a film is unpreferably lowered or an amount of light incident on a photosensitive material is remarkably lowered. A particle size of the powder is preferably at most 1 $\mu$m, more preferably at most 0.5 $\mu$m, in view of an image quality. If the particle size of the powder is larger than 1 $\mu$m, an incident light scatters and an image of a line does not become sharp and is practically unusable. On the other hand, a technique of cleaning at the same time as development or a cleaningless technique as disclosed in JP-A-5-2287 is also applicable for the toner of the present invention.

A conventionally known system can be employed as an image-forming apparatus applicable for the electrostatic image developing toner of the present invention, examples of which include a system of heating under pressure using a heat roller, a system of fixing by flash for high-speed fixing, or the like. In the system of heating under pressure using a heat roller, fixing is carried out by passing a fixing sheet having a toner image on the surface under pressure by a heat roller, the surface of which is prepared by a material having a release property to the toner. According to this system, since the toner image of the fixing sheet is made contact with the surface of the heat roller under pressure, a heat efficiency for melting the toner image on the fixing sheet is very satisfactory, and the fixing can be promptly carried out so as to be very effective for a high-speed electrophotographic copying machine.

In place of the system of heating under pressure by the heat roller, another fixing system may be employed, which comprises placing a recording material in contact with a heated material intervening a film under pressure by a pressing member.

In order to improve an offset property so as not to have a toner attached to the surface of a fixing roller, the surface of the roller may be composed of a material having an excellent release property (such as a fluorine type resin) to a toner and an offset-improving liquid such as a silicone oil is further applied to the surface to coat a thin film of the offset-improving liquid on the roller surface, thereby achieving a very high effect.

When using a toner softened by heat, which is easily attached to a developing roller, an electrostatic image-holding material, a contact charging element and the like, it is effective for improving a fixing performance to incorporate a low molecular weight component such as a wax component into a toner.

In the electrostatic developing toner of the present invention, in view of image property and productivity of the toner, the toner should preferably have an average particle size based on volume in the range of from 2 to 15 $\mu$m as measured by a laser type particle size distribution-measuring machine such as micronsizer (manufactured by Seishin Kigyo K.K.). A more preferable average particle size is in a range of from 3 to 12 $\mu$m. If the average particle size exceeds 15 $\mu$m, resolving power and sharpness become poor, and if the average particle size is less than 2 $\mu$m, the resolving power is satisfactory, but a yield of toner production becomes low and a production cost becomes high, and various tendency that a problem of scattering of a toner in a machine and a health problem due to invasion of a toner into a human skin are caused.

With regard to a particle size distribution of the electrostatic image developing toner of the present invention, by measuring a particle size by a COULTER COUNTER (TA-II manufactured by COULTER Co.), a content of particles having a particle size of at most 2 µm is preferably in a range of from 10 to 90% on the basis of the number of particles, and a content of particles having a particle size of at least 12.7 µm is preferably in a range of from 0 to 30% on the basis of volume.

The electrostatic image developing toner of the present invention preferably has a specific surface area in a range of from 1.2 to 5.0 m$^2$/g, more preferably in a range of from 1.5 to 3.0 m$^2$/g, as measured by BET specific surface area measurement using nitrogen as a desorption-adsorption gas. The measurement is carried out by using a BET specific surface area measuring apparatus (Flow SorbII2300, manufactured by Shimadzu Seisakusyo K.K.), and a specific surface area is defined as a value determined from a desorbed gas amount measured by desorbing an adsorbed gas on a toner surface at 50° C. for 30 minutes, adsorbing a nitrogen gas again by rapidly cooling with liquid nitrogen, and heating to 50° C. again for carrying out desorption again.

An apparent specific gravity (bulk density) of the electrostatic image developing toner of the present invention is measured by using a powder tester (manufactured by Hosokawa Micron K.K.) and using a container attached to the measuring apparatus in accordance with the manual of this measuring apparatus. When the toner of the present invention is a non-magnetic toner, the toner should preferably have an apparent specific gravity of from 0.2 to 0.6 g/cc, and when the toner of the present invention is a magnetic toner, the toner should preferably have an apparent specific gravity of from 0.2 to 2.0 g/cc although it may vary depending on a content and a type of a magnetic powder used.

When the electrostatic image developing toner of the present invention is a non-magnetic toner, a toner should preferably have a true specific gravity of from 0.9 to 1.2 g/cc, and when the toner is a magnetic toner, the toner should preferably have a true specific gravity of from 0.9 to 4.0 g/cc although it varies depending on a content and a type of a magnetic powder used. The true specific gravity of the toner is measured by accurately measuring a weight of 1.000 g of toner, placing the measured toner in a 10 mmΦ tablet-molding machine, press-molding under a pressure of 200 kgf/cm$^2$ in vacuum, and measuring a height of the molded product of cylindrical shape by a micrometer, thereby calculating a true specific gravity.

A fluidity of a toner is defined as a flow angle of repose and a static angle of repose measured by a Tsutsui type repose angle-measuring apparatus (manufactured by Tsutsui Rika K.K.). The electrostatic image developing toner using a charge control agent of the present invention preferably has a flow angle of repose of from 5° to 45° and a static angle of repose of from 10° to 50°.

The electrostatic image developing toner of the present invention preferably has a volume resistivity of from $1\times10^{12}$ to $1\times10^{16}$ Ω·cm in a case of a non-magnetic toner and also has a volume resistivity of from $1\times10^8$ to $1\times10^{16}$ Ω·cm in a case of a magnetic toner although it varies depending on a content and a type of a magnetic powder used. The volume resistivity of the toner is measured by pressure-molding toner particles into a disk-like test piece having a diameter of 50 mm and a thickness of 2 mm, fixing the test piece on an electrode for solid (SE-70 manufactured by Ando Denki K.K.), and measuring a resistance value one hour after continuously applying a direct current voltage of 100 V by using a high insulating resistance meter (4339A manufactured by Hughlet Packard Co.).

The electrostatic developing toner of the present invention preferably has a dielectric dissipation factor of from $1.0\times10^{-3}$ to $15.0\times10^{-3}$ in a case of a non-magnetic toner and also has a dielectric dissipation factor of from $2\times10^{-3}$ to $30\times10^{-3}$ in a case of a magnetic toner although it varies depending on a content and a kind of a magnetic powder used. The volume resistivity of the toner is measured by pressure-molding toner particles into a disk-like test piece having a diameter of 50 mm and a thickness of 2 mm, fixing the test piece on an electrode for solid, and measuring a dielectric dissipation factor (Tan δ) value obtained by applying a frequency of 1 KHz and a peak to peak voltage of 0.1 KV by using a LCR meter (4284A manufactured by Hughlet Packard Co.).

The electrostatic image developing toner of the present invention preferably has an Izod impact strength of from 0.1 to 30 kg·cm/cm. The Izod impact strength of the toner is measured by subjecting a plate-like test piece prepared by heat-melting toner particles to a test of JIS standard K-7110 (impact strength test method of rigid plastic).

The electrostatic image developing toner of the present invention preferably has a melt index (MI value) of from 10 to 150 g/10 min. The melt index (MI value) of the toner is measured at a temperature of 125° C. under a load of 10 kg in accordance with JIS standard K-7210 (A method).

The electrostatic image developing toner of the present invention preferably has a melting-initiating temperature in a range of from 80 to 180° C., and also has a 4 mm-offset temperature in a range of from 90 to 220° C. The melt-initiating temperature of the toner is measured by pressure-molding toner particles into a cylindrical test piece having a diameter of 10 mm and a thickness of 20 mm, setting the test piece in a heat-melting property-measuring apparatus, e.g. a flow tester (CFT-500C manufactured by Shimadzu Seisakusyo K.K.) and measuring a temperature value, at which a piston begins to descend under a load of 20 kgf/cm$^2$ at the initiation of melting. The 4 mm descending temperature of the toner is measured by measuring a temperature value, at which a piston descends 4 mm in the same test as above.

The electrostatic image developing toner of the present invention preferably has a glass transition temperature (Tg) in a range of from 45 to 80° C., more preferably in a range of from 55 to 75° C. The glass transition temperature of the toner is measured from a peak value of a phase change appeared when raising a temperature at a constant rate, rapidly cooling and raising a temperature again by using a differential thermogravimetry apparatus (DSC). When the Tg value of the toner is lower than 45° C., an offset resistance and a storage stability become poor and when the Tg value exceeds 80° C., a fixing strength of an image is lowered.

The electrostatic image developing toner of the present invention preferably has a weight average molecular weight (Mw) in a range of from 50,000 to 3,000,000. Also, a Mw/Mn ratio showing a molecular weight distribution is preferably in a range of from 3 to 500. The molecular weight distribution may have only one peak or may have a plurality of peaks of two or more. The molecular weight of the toner is measured by dissolving a predetermined amount of toner particles in an organic solvent such as THF, removing an undissolved material by filtrating with a filter and subjecting the dissolved material only to GPC (gel permeation chromatography).

Among resin components of the electrostatic image developing toner of the present invention, a gel-like component insoluble in tetrahydrofuran (THF) preferably has a weight average molecular weight (Mw) in a range of from 500,000 to 6,000,000. Also, a Mw/Mn ratio illustrating a molecular weight distribution is preferably in a range of from 3 to 500. The molecular weight distribution may have only one peak or may have a plurality of peaks of two or more. The gel-like component is preferably in an amount of from 0 to 30 wt % to the total resin constituting the toner.

The electrostatic image developing toner of the present invention preferably has a melt viscosity in a range of from 1,000 to 50,000 poises, more preferably from 1,500 to 38,000 poises. The melt viscosity of the toner is measured by pressure-molding toner particles into a cylindrical test piece having a diameter of 10 mm and a thickness of 2 cm, setting the test piece in a heat melt property-measuring apparatus, e.g. a flow tester (CFT-500C manufactured by Shimadzu Seisakusyo K.K.), and measuring the melt viscosity under a load of 20 kgf/cm$^2$.

A solvent-dissolved remaining content of the toner of the present invention is preferably in a range of from 0 to 30 wt % as a content insoluble in tetrahydrofuran (THF), in a range of from 0 to 40 wt % as a content insoluble in ethyl acetate and in a range of from 0 to 30 wt % as a content insoluble in chloroform. The solvent-dissolved remaining content is measured by uniformly dissolving or dispersing 1 g of a toner respectively 100 ml of tetrahydrofuran (THF), ethyl acetate and chloroform, pressure-filtrating the solution or the dispersion, drying the filtrate to carry out quantitative determination, and calculating a percentage of an insoluble material of the toner, which is insoluble in an organic solvent.

EXAMPLES

Hereinafter, the present invention is further illustrated with reference to the Examples.

Preparation Example 1

A organic metal complex compound was obtained by subjecting Compound (1) metal complex-formed and pair-ionized by a well-known method to filtration by a filter press and washing with water, and then drying. The product thus obtained was passed through a sieve of 20 mesh to adjust a particle size so as to be capable of being mixed into a toner.

Preparation Example 2

A organic metal complex compound was obtained by subjecting Compound (1) metal complex-formed and pair-ionized by a well-known method to filtration by a centrifugal filter and washing with water, and then drying. The product thus obtained was passed through a sieve of 20 mesh to adjust a particle size so as to be capable of being mixed into the toner.

Example 1

Example of using the Compound (1) prepared by the above Preparation Example 1, which has an electroconductivity of 75 μS/cm when dispersed in water:

| | |
|---|---|
| Styrene-acryl type copolymer (TB-1000 manufactured by Sanyo Kasei K.K.) | 92 parts by weight |
| Carbon black | 5 parts by weight |
| Wax | 2 parts by weight |
| Compound (1) | 1 part by weight |

The above composition was mixed after melting the styrene-acryl type copolymer in a heating kneader, and the mixture was cooled and roughly pulverized by a hammer mill, and was then pulverized by a jet mill. The fine powder thus obtained was classified by a gas stream type finely classifying apparatus to obtain a toner having an average particle size of 6.5 μm. The toner thus obtained was mixed with an iron powder carrier of about 200 mesh in a weight ratio of 1:25 (toner: iron powder carrier) to prepare a developer. By using the developer thus obtained, an image density was measured by a developing apparatus, and an image quality of copies was the same under conditions of a high temperature of 30° C. and a high humidity of 80% RH and under conditions of a low temperature of 10° C. and a low humidity of 30% RH and also under conditions of a normal temperature and a normal humidity. Also, there were no fogging and no scattering of the toner. An image density of 1.45±0.05 was maintained.

Example 2

Example of using the Compound (1) prepared by the above Preparation Example 2, which has an electroconductivity of 89 μS/cm when dispersed in water:

| | |
|---|---|
| Styrene-acryl type copolymer (TB-1000 manufactured by Sanyo Kasei K.K.) | 92 parts by weight |
| Carbon black | 5 parts by weight |
| Wax | 2 parts by weight |
| Compound (1) | 1 part by weight |

The above composition was mixed after melting the styrene-acryl type copolymer in a heating kneader, and was cooled and was roughly pulverized by a hammer mill, and was finely pulverized by a jet mill. The fine powder thus obtained was classified by a gas stream type finely classifying apparatus to obtain a toner having an average particle size of 9 μm. The toner thus obtained was mixed with an iron powder carrier of about 200 mesh in a weight ratio of 1:25 (toner: iron powder carrier) to prepare a developer. By using the developer thus obtained, an image density was measured by a developing apparatus, and an image quality of copies was the same under conditions of a high temperature of 30° C. and a high humidity of 80% RH and under conditions of a low temperature of 10° C. and a low humidity of 30% RH and also under conditions of a normal temperature and a normal humidity. Also, there were no fogging and no scattering of the toner. An image density of 1.35±0.05 was maintained.

Example 3

Example of using the compound (1) prepared by the above Preparation Example 2, which has an electroconductivity of 10 μS/cm when dispersed in water:

| | |
|---|---|
| Styrene-acryl type copolymer (TB-1000 manufactured by Sanyo Kasei K.K.) | 92 parts by weight |
| Carbon black | 5 parts by weight |
| Wax | 2 parts by weight |
| Compound (1) | 1 part by weight |

A fine powder was obtained in the same manner as in Examples 1 and 2, except that the Compound (1) having an electroconductivity of 10 µS/cm when dispersed in water was employed, and was classified by a gas stream type finely classifying apparatus to obtain a toner having an average particle size of 7 µm. The toner thus obtained was mixed with an iron powder carrier of about 200 mesh in a weight ratio of 1:25 (toner: iron powder carrier) to prepare a developer. By using the developer thus prepared, an image density was measured by a developing apparatus, and an image quality of copies was the same under conditions of a high temperature of 30° C. and a high humidity of 80% RH and under conditions of a low temperature of 10° C. and a low humidity of 30% RH and also under conditions of a normal temperature and a normal humidity. Also, there were no fogging and no scattering of the toner. An image density of 1.44±0.05 was maintained.

Comparative Example 1

Example of using Compound (1) having an electroconductivity of 310 µS/cm when dispersed in water:

| | |
|---|---|
| Styrene-acryl type copolymer (TB-1000 manufactured by Sanyo Kasei K.K.) | 92 parts by weight |
| Carbon black | 5 parts by weight |
| Wax | 2 parts by weight |
| Compound (1) | 1 part by weight |

A fine powder was obtained in the same manner as in Example 1, except that the Compound (1) having an electroconductivity of 310 µS/cm when dispersed in water was employed, and was classified by a gas stream type finely classifying apparatus to obtain a toner having an average particle size of 7.5 µm. The toner thus obtained was mixed with an iron powder carrier of about 200 mesh in a weight ratio of 1:25 (toner: iron powder carrier) to prepare a developer. By using the developer thus obtained, an image density was measured by a developing apparatus, and an image density was lowered under conditions of a high temperature of 30° C. and a high humidity of 80% RH. The image density thus measured was 0.19±0.05 which was not a satisfactory value.

Comparative Example 2

Example of using Compound (1) having an electroconductivity of 361 µS/cm when dispersed in water:

| | |
|---|---|
| Styrene-acryl type copolymer (TB-1000 manufactured by Sanyo Kasei K.K.) | 92 parts by weight |
| Carbon black | 5 parts by weight |
| Wax | 2 parts by weight |
| Compound (1) | 1 part by weight |

A fine powder was obtained in the same manner as in Example 1, except that the Compound (1) having an electroconductivity of 361 µS/cm when dispersed in water was used, and a fine powder was classified by a gas stream type finely classifying apparatus to obtain a toner having an average particle size of 9 µm. The toner thus obtained was mixed with an iron powder carrier of about 200 mesh in a weight ratio of 1:25 (toner: iron powder carrier) to prepare a developer. By using the developer thus prepared, an image density was measured by a developing apparatus, and an image density was lowered under conditions of a high temperature of 30° C. and a high humidity of 80% RH. An image density of 0.60±0.05 was not a satisfactory density.

In addition to Examples 1 to 3 and Comparative Examples 1 to 2, a relation between an image density and an electroconductivity of Compound (1) when dispersed in water were tested and measured, the results are shown in the following Table 1.

TABLE 1

| | Examples | | | Comparative Examples | |
|---|---|---|---|---|---|
| | Electro-conductivity (µS/cm) | Image density (O.D.) | | Electro-conductivity (µS/cm) | Image density (O.D.) |
| 1 | 75 | 1.45 | 1 | 310 | 0.19 |
| 2 | 89 | 1.35 | 2 | 361 | 0.60 |
| 3 | 69 | 1.41 | 3 | 794 | 0.31 |
| 4 | 70 | 1.30 | 4 | 162 | 0.10 |
| 5 | 74 | 1.27 | 5 | 191 | 0.20 |
| 6 | 83 | 1.36 | 6 | 154 | 0.72 |
| 7 | 62 | 1.47 | | | |
| 8 | 80 | 1.21 | | | |
| 9 | 76 | 1.31 | | | |
| 10 | 10 | 1.44 | | | |
| 11 | 28 | 1.36 | | | |
| 12 | 54 | 1.23 | | | |
| 13 | 90 | 1.36 | | | |
| 14 | 109 | 1.20 | | | |

As evident from the above Table 1, an electrostatic image developing toner containing a organic metal complex compound having an electroconductivity of at most 110 µS/cm when measuring by dispersing 1 wt % of a organic metal complex compound in ion-exchanged water, provides a stable image and an excellent environmental stability.

The entire disclosure of Japanese Patent Application No. 11-347464 filed on Dec. 7, 1999 including specification, claims, drawings and summary are incorporated herein by reference in its entirety.

What is claimed is:

1. An electrostatic image developing non-magnetic toner, comprising:

a binder resin and a charge control agent which comprises a crystalline organometal complex compound having the formula (3), which has an electroconductivity of at most 110 µS/cm when dispersed in ion-exchanged water in an amount of 1 wt % and which includes an inorganic salt that can adversely affect image stability during the operation of an electrophotographic device containing the toner over extended periods of time, but which adverse affect is not realized by said organometal complex compound that has an electroconductivity of at most 110 µS/cm when dispersed in ion-exchanged water in an amount of 1 wt %:

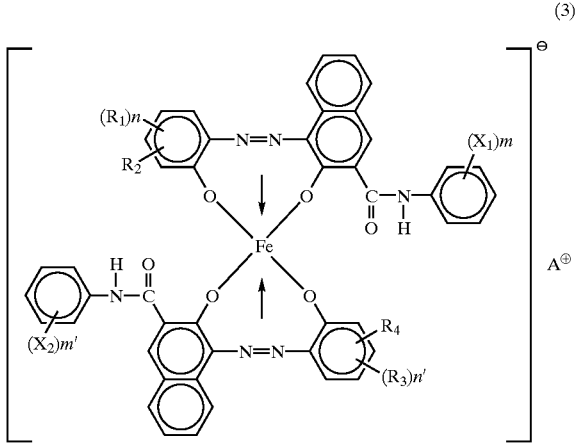

(3)

wherein $X_1$ and $X_2$, which may be the same or different, are each hydrogen, $C_1$–$C_4$-alkyl, $C_1$–$C_4$-alkoxy, nitro or halogen; and m and m' are each an integer from 1 to 3; $R_1$ and $R_3$, which may be the same or different, are each hydrogen, a $C_{1-18}$ alkyl group, a $C_{1-18}$ alkoxy group, an alkenyl group, a sulfonamide group, a sulfonalkyl group, a sulfonic acid group, a carboxyl group, a carboxyester group, hydroxyl, acetylamino, benzoylamino or halogen and n and n' are each an integer of from 1 to 3; $R_2$ and $R_4$ are each hydrogen or nitro; and $A^+$ is hydrogen ion, sodium ion, potassium ion, ammonium ion, organoammonium ion or a mixture thereof, formulated in the electrostatic image developing non-magnetic toner.

2. The electrostatic image developing non-magnetic toner according to claim 1, wherein the total amount of the charge control agent in the non-magnetic toner ranges from 0.1 to 10 parts by weight, per 100 parts by weight of the binder resin.

3. The electrostatic image developing non-magnetic toner according to claim 1, wherein the non-magnetic toner comprises a coloring agent in an amount of 0.1 to 20 parts by weight, per 100 parts by weight of the binder resin.

4. The electrostatic image developing non-magnetic toner according to claim 1, wherein the volume average particle size of the charge control agent ranges from 1 to 20 μm.

* * * * *